No. 679,958. Patented Aug. 6, 1901.
J. ELLENBECKER.
REVOLVING CHAIR.
(Application filed Sept. 10, 1900.)
(No Model.)
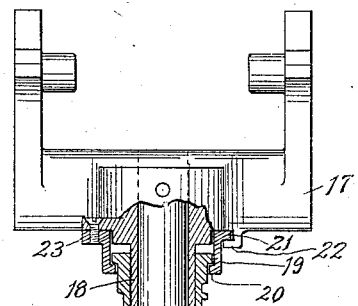
Fig. 1.
Fig. 4.
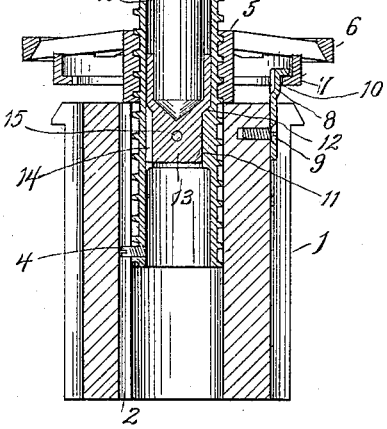
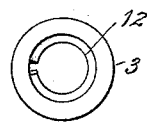
Fig. 5.
Fig. 2.
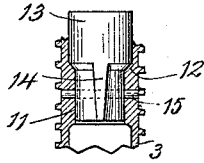
Fig. 6.
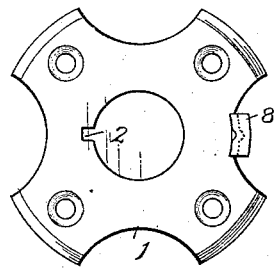
Fig. 3.
Fig. 7.
Witnesses.
O. H. Keeney
Anna V. Faust
Inventor.
John Ellenbecker
By Benedict & Morsell
Attorneys.
THE NORRIS PETERS CO., PHOTO-LITHO., WASHINGTON, D. C.

UNITED STATES PATENT OFFICE.

JOHN ELLENBECKER, OF PORT WASHINGTON, WISCONSIN.

REVOLVING CHAIR.

SPECIFICATION forming part of Letters Patent No. 679,958, dated August 6, 1901.

Application filed September 10, 1900. Serial No. 29,500. (No model.)

*To all whom it may concern:*

Be it known that I, JOHN ELLENBECKER, of Port Washington, in the county of Ozaukee and State of Wisconsin, have invented a new and useful Improvement in Revolving Chairs, of which the following is a description, reference being had to the accompanying drawings, which are a part of this specification.

My invention relates to improvements in revolving chairs, and especially in the means whereby the seat of a chair is made revoluble and in the means adapted for raising and lowering the seat.

The invention consists of the devices and their combinations as herein described and claimed or the equivalent thereof.

In the drawings, Figure 1 is a section of the construction of the principal members of the construction embodying my invention. Fig. 2 is a view of the under side of the nut and its hand-wheel with related parts, a locking and retaining device being shown in section. Fig. 3 is a top plan view of the hub. Fig. 4 shows a coupling-ring employed to couple the head of the spindle to the sleeve revolubly. Fig. 5 is a view of the end at the top of the sleeve. Fig. 6 shows the spindle foot-block in connection with a fragment of the sleeve in section. Fig. 7 shows a modified form of a nut-retaining device in connection with a fragment of the hub and of the nut and its hand-wheel.

In the drawings, 1 is the metal hub, to which the spreading legs of the chair are secured for supporting the chair thereon. The hub is provided with a longitudinal bore having a smooth surface and provided at one side with a groove 2. An elongated hollow sleeve 3, screw-threaded on its exterior, is fitted slidable vertically in the bore of the hub and is held against revolution therein by a pin 4, fixed in the sleeve and projecting into the groove 2. A nut 5 turning on the thread of the sleeve rests on the top of the hub and is adapted by being rotated to raise and lower the sleeve and its load in the hub. The nut is provided with a hand-wheel 6 for conveniently rotating it. An annular flange 7, secured to and forming a part of the hand-wheel, in connection with a coupling device 8, secured to the hub, is a means for holding the nut and the sleeve revolubly to the hub. The coupling device is advisably secured to the hub releasably by means of a screw 9. The coupling device 8 is also advisably of elastic material and is provided with a catch 10, adapted to enter notches therefor in the edge of the flange 7. The overturned head of the coupling device 8 is above the flange 7 and prevents the nut and the sleeve from being lifted from the hub 1, and the catch 10 entering any one of the notches therefor in the flange 7 locks the nut releasably in position against rotation.

The sleeve 3 on its interior surface is provided medially with an annular boss contracting the size of its bore and forming a shoulder 12 at the top of the boss. A cylindrical spindle-block 13 fits in the bore of the sleeve and is provided with an annular shoulder, that is seated on the shoulder 12 of the boss 11. This spindle-block is advisably constructed of chilled iron or other exceedingly-hard metal, whereby it is adapted to resist wear. This spindle-block is advisably provided with a wedge-shaped rib 14 on the exterior surface of its contracted portion, which fits into a correspondingly-shaped recess in the boss 11, whereby the spindle-block is secured in the sleeve releasably and against rotation. The spindle-block may also be secured in the sleeve, if desired, by a removable pin 15, though such pin is not ordinarily required.

The chair-seat spindle 16 projects downwardly in the sleeve 3 and is fitted and supported rotatively in the spindle-block 13. The spindle-block is advisably provided with a socket in its upper end to receive the spindle therein. The spindle-head 17 is fixed on the upper end of the spindle. The spindle and spindle-head may be constructed integrally; but preferably the spindle-head 17 is constructed of cast metal, and the spindle 16 is preferably of steel, inserted in and secured rigidly to the spindle-head. The spindle is supported revolubly in the sleeve 3, at or near the upper extremity of the sleeve, conveniently by means of an annular flange or bushing 18, formed on the head 17 about the spindle 16 and fitting rotatively in the bore of the sleeve. A coupling-ring 19 is provided at its lower end with an inwardly-projecting annular flange 20, that turns under a correspondingly outwardly-turned annular head on the sleeve 3, and the coupling-ring at its other end is provided with an outwardly-extending beveled lip 21, adapted to engage a catch 22 on the spindle-head 17. The coupling-ring 19 may also be secured to the spindle-head by a screw 23, turning into a lip on the ring opposite the lip 21. This construction couples the sleeve 3 to the spindle-head rotatably, but so as to prevent the accidental removal of the spindle from the sleeve by lifting the chair-seat or otherwise.

In the modified form of construction shown in Fig. 7 the flange 7' is turned outwardly, and the coupling device 8 is reversed from the position shown in Fig. 1. Otherwise the construction is the same as that shown in Figs. 1 and 2.

What I claim as my invention is—

1. In combination, a smooth-bore hub provided with a longitudinal groove, a hollow externally-screw-threaded sleeve slidable endwise in the hub and provided interiorly with an inwardly-projecting annular shoulder and with a pin projecting exteriorly into the groove in the hub, a nut resting on the hub and turning on the thread of the sleeve, a detachable spindle-block seated on the annular shoulder in the sleeve, and a spindle footed in the block and rotatable in the sleeve.

2. In combination, a smooth-bore hub, a hollow exteriorly-screw-threaded sleeve provided medially with an interior inwardly-projecting shoulder and slidable endwise in the bore of the hub, means securing the sleeve against rotation in the hub, a nut resting on the hub and turning on the sleeve, a metal spindle-block seated removably and non-revolubly on the shoulder in the sleeve, and a chair-seat spindle footed in the spindle-block and rotatable in the sleeve.

3. In combination, a smooth-bore hub, an exteriorly-screw-threaded sleeve movable endwise in the hub, a nut resting on the hub and turning on the sleeve, an annular flange on the nut disposed in a radial plane and provided with notches, and an elastic coupling device fixed on the hub and disposed to engage said flange and prevent the escape of the nut and the sleeve from the hub and to hold the nut releasably against rotation.

4. In combination, a smooth-bore hub, a hollow exteriorly-screw-threaded sleeve loose in the hub, a nut resting on the hub and turning by its screw-thread on the sleeve, means holding the nut to the hub rotatively, a spindle provided with a head, the spindle being seated rotatively in the sleeve, and a coupling-ring secured detachably to the spindle-head and engaging and connecting the sleeve rotatively to the spindle-head.

In testimony whereof I affix my signature in presence of two witnesses.

JOHN ELLENBECKER.

Witnesses:
WILLIAM AHLHAUSER,
JOSEPH GITZEN.